United States Patent [19]

Boucton et al.

[11] Patent Number: 5,074,363

[45] Date of Patent: Dec. 24, 1991

[54] DEVICE FOR TREATING SOIL BY BREAKING UP SOIL CLODS AND COMPACTED SOIL

[75] Inventors: Jean Boucton, Bazancourt; Benoit Franquet, Reims, both of France

[73] Assignee: Etablissements Franquet, Guignicourt, France

[21] Appl. No.: 415,225

[22] PCT Filed: Dec. 21, 1988

[86] PCT No.: PCTFR88/000632

§ 371 Date: Aug. 22, 1989

§ 102(e) Date: Aug. 22, 1989

[87] PCT Pub. No.: WO89/05572

PCT Pub. Date: Jun. 29, 1989

[30] Foreign Application Priority Data

Dec. 22, 1987 [FR] France ................. 87 17949

[51] Int. Cl.$^5$ ............................................. A01B 27/00
[52] U.S. Cl. .................................... 172/520; 172/532; 172/608
[58] Field of Search .................. 172/39, 48, 49, 52, 172/66, 68, 69, 119, 520, 532, 539, 606, 608

[56] References Cited

U.S. PATENT DOCUMENTS

| | | | |
|---|---|---|---|
| 552,794 | 1/1896 | Stump | 172/532 |
| 958,346 | 5/1910 | Williamson et al. | 172/532 X |
| 985,641 | 2/1911 | Stier | 172/532 X |
| 1,237,446 | 8/1917 | Arce | 172/532 X |
| 1,836,984 | 12/1931 | Newsom | 172/532 X |
| 2,261,893 | 11/1941 | Wolfard . | |
| 2,300,851 | 11/1942 | Wolfard . | |
| 2,503,317 | 4/1950 | Berquist . | |
| 2,513,186 | 6/1950 | Leaman | 172/119 X |
| 2,997,113 | 8/1961 | van der Lely | 172/60 X |
| 3,897,830 | 8/1975 | van der Lely | 172/177 X |

FOREIGN PATENT DOCUMENTS

| | | |
|---|---|---|
| 208010 | 1/1987 | European Pat. Off. . |
| 302238 | 2/1989 | European Pat. Off. . |
| 2824808 | 3/1979 | Fed. Rep. of Germany . |
| 3541543 | 5/1987 | Fed. Rep. of Germany . |
| 2369783 | 11/1977 | France . |
| 43426 | 12/1917 | Sweden ............... 172/532 |
| 604523 | 4/1978 | U.S.S.R. ............... 172/532 |
| 212703 | 3/1924 | United Kingdom . |
| 2201073 | 8/1988 | United Kingdom ........ 172/608 |

Primary Examiner—Dennis L. Taylor
Assistant Examiner—Jeffrey L. Thompson
Attorney, Agent, or Firm—Wenderoth, Lind & Ponack

[57] ABSTRACT

The invention is directed to an apparatus for treating soil by breaking up soil clods and compacted earth. The apparatus includes a carrier frame angularly maneuverable in relation to the longitudinal or forward direction of movement of the apparatus, and in which are mounted at least two rotating parallel helical blade elements, of which at least one rolls on the ground. Each of the helical elements, whether of the same or different diameters, has a pitch and a diameter such that, when in joint rotation, the spires of one of the blade elements remains in close contact with the spires of the other blade element or elements. Each of the helical blade elements is operatively connected mechanically for simultaneous rotation with the other blade element or elements. The operative connection between the blade the blade elements is, for example, achieved by endless chains trained about pinion fixed on respective ends of rotating shafts to which the helical elements are fixed. The number of teeth on each of the blade elements is determined by the pitch and diameter of the spires of each of the corresponding helical elements.

22 Claims, 4 Drawing Sheets

DEVICE FOR TREATING SOIL BY BREAKING UP SOIL CLODS AND COMPACTED SOIL

BACKGROUND OF THE INVENTION

The present invention concerns a device for treating soil, in particular by breaking up of soil clods and compacted soil.

Conventional agricultural techniques already employ a large number of soil-treatment devices designed to loosen and compact the soil to make possible the next sowing after harvest, or else to treat it after clearing of stubble.

The systems now used for this purpose have a number of major disadvantages, a principal one among them being the packing in of ground that is too light or the muddying of heavy land.

SUMMARY OF THE INVENTION

The present invention remedies these disadvantages, focusing on a device for treating the soil by the breaking up of soil clods and compacted soil. The device may, at the discretion of the user, be used alone or in combination with other conventional soil-preparation systems.

The device in accordance with the invention, which may be harnessed to a traction apparatus in any conventional manner (e.g., to a three-point hitch of a tractor), is characterized by the fact that it is composed of a carrier frame which is angularly maneuverable in relation to the direction of movement of the tractor. The carrier frame includes at least two helical, rotating blade elements, at least one of which rolls on the ground. Each of the helical elements incorporated in the frame, whether of identical or varying diameter, has a pitch and a diameter such that, during rotation, the spires of one remain in close contact with the spires of the other.

Thus, continuous cleaning of the spires of the helical elements mounted on the device is achieved. At the same time, because of the spiral or helical nature of the blade elements, the spires thereof are angled in relation to the longitudinal or forward direction of movement of the device. This angled relationship ensures a complementary ground-treating effect, in which the earth is mixed and spread out to a greater extent by the spires of the blade elements, than if the blade elements were in parallel with the longitudinal direction.

In order to ensure, according to the invention, mutual sliding movement of the spires of one helical blade element against the spires of the other helical blade element, the helical blade elements are operatively coupled together for simultaneous rotation.

Other characteristics and advantages of the invention will emerge from the following description taken with reference to the attached drawings which represent, diagrammatically and solely as examples, various embodiments of an earth-breaking and compacting device appropriate for agricultural use.

DETAILED DESCRIPTION OF THE INVENTION

The apparatus in accordance with the invention incorporates a frame fitted with having means thereon for harnessing the apparatus to a tractor. For example, such harnessing means may include a plough-beam movable in relation to axes of helical blade elements (described below) which constitute the main part of the device. Such conventional means, which does not, by itself, form an inventive feature of the invention, has not been illustrated for reasons of simplicity.

Figure 1:
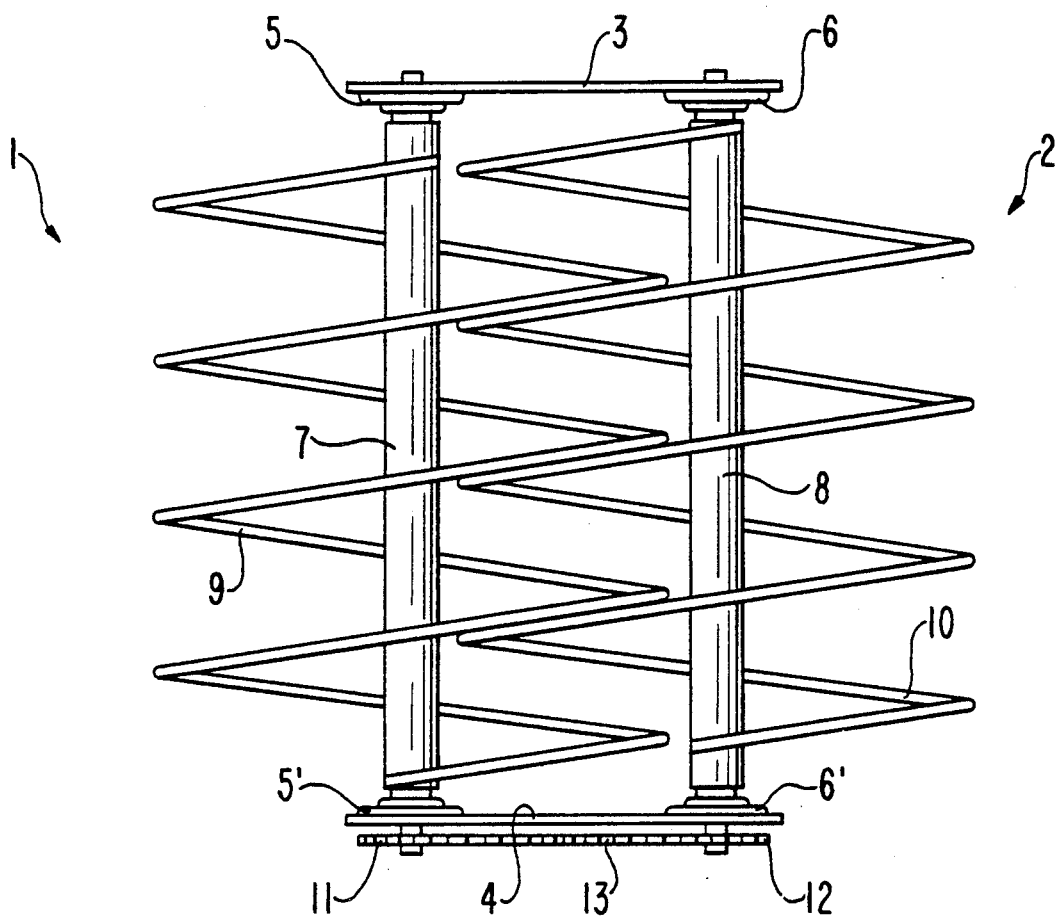
FIG. 1 is a plan view of a first embodiment of a device according to the invention, incorporating two identical helical blade elements, both of which roll on the ground.

As shown in FIG. 1, in a first embodiment, the device of the present invention includes two identical blade elements referenced as 1 and 2 and mounted so as to rotate parallel to one another in a frame. The frame is formed by two parallel and spaced apart forks 3, 4. Each of the forks 3, 4 is equipped with bearings 5, 5' and 6, 6', in which are rotatably inserted, respectively, shafts 7 and 8. The helical blade elements 1, 2 (each individual turn of which is known as a spire 9, 10) are mounted to the shafts 7, 8, respectively. Each of the shafts 7, 8 has a pinion 11, 2 fixed to one end thereof, in this particular instance near the fork 4 supporting the bearinqs 5' and 6'. An endless chain 13 is trained about the pinions 11, 12 so as to operatively connect the two helical blade elements 1 and 2 for simultaneous rotation, i.e. to cause both of the blade elements 1, 2 to turn even if only one of the elements rests on the ground. As shown in the drawing figures, the blade elements 1, 2 are respectively fixed for rotation with the shafts 7, 8 by a plurality of radially extending connection elements 20.

Figure 2:
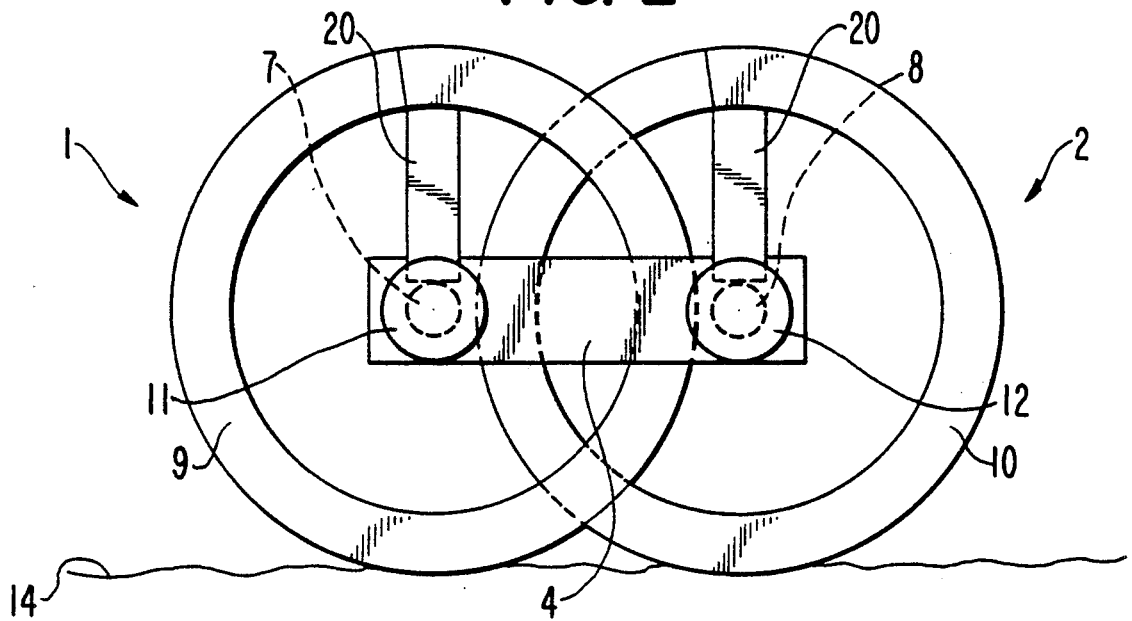
FIG. 2 is a side view of the device shown in FIG. 1, shown without an attachment chain.

FIG. 2 shows that each of the spires 9 of the blade element 1 is identical, i.e. has the same diameter and the same pitch and, likewise, that each of the spires 10 of the blade element 2 is identical. While rolling on the ground 14, the helical spires 9 of blade element 1 of the device cause the shaft 7 and, in turn, the toothed pinion 11 to rotate in the bearing 5'. Rotation of the pinion 11 then causes the chain 13 to synchronously rotatably drive the toothed pinion 12 which has the same number of teeth as the pinion 11. This causes the shaft 8 to rotate in the same direction as the shaft 7, such that the spires 10. Due to the rotation of the spires 9 and 10 of the blade element 2 which also rotate in close mutual contact, soil which may have adhered thereto is removed.

In this way, a complete and continuous cleaning of the two helical blade elements is ensured, and their action is optimally effective.

Of course, the spires facing each other must be nearly contiguous and capable of slight play, precisely in order to avoid the wear and tear of rubbing together.

Figure 3:
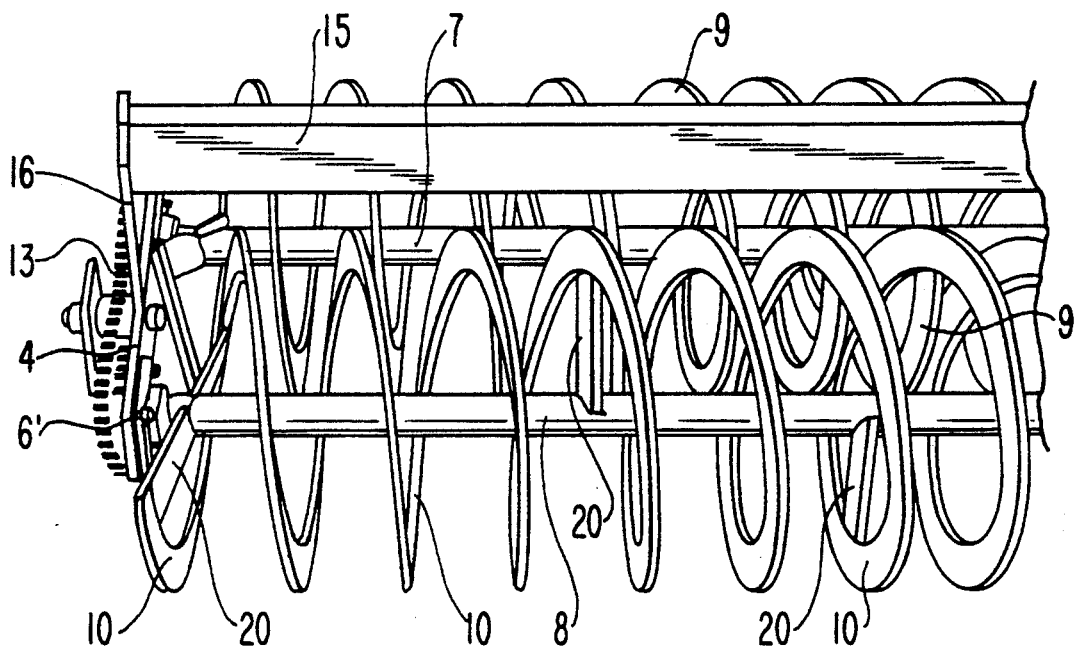
FIG. 3 is a rear perspective view, partially cut away, of the device shown in FIGS. 1 and 2.

FIG. 3 is a partial perspective view of the first embodiment of the apparatus in which the frame 15 of the device is visible. The frame 15 is connected by means of wheel discs such as 16 to the forks 3, 4 bearing the shafts 7 and 8. To allow this frame 15 to be maneuvered so that the helical elements 1 and 2 (cf. FIG. 1) form a more or less pronounced acute angle with the longitudinal or forward direction of the device, the frame incorporates conventional means (not illustrated here so as to increase the readability of the drawing) such as a semi-circular limb having adjustment holes with a key, to adjust the direction of shafts 7 and 8 in relation to the direction of forward progress of the tractor pulling the device according to the invention.

Figure 4:
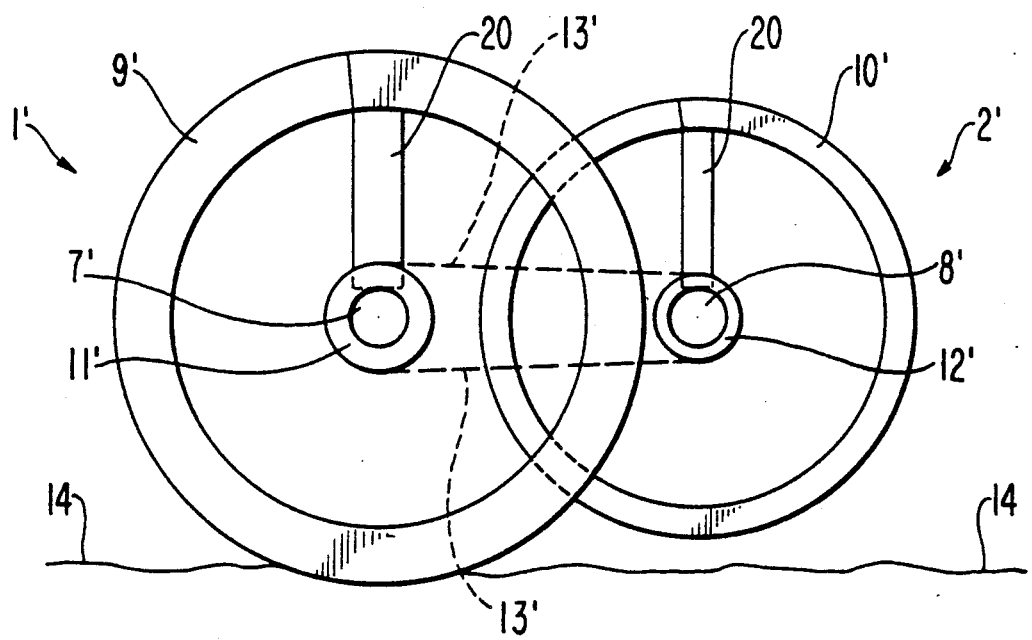
FIG. 4 is a side view of a firs embodiment of the apparatus, incorporating two differing helical blade elements which do not both rest on the ground.

As has already been indicated, FIG. 4 is a side view of a device according to a modified version of the first embodiment of the invention, which is equipped with a helical blade element 1' (having spires 9') resting on the ground and working in conjunction with a smaller-diameter blade element 2' whose spires 10' do not rest on the ground.

This embodiment of the apparatus, to ensure the continuous contact of the spires 9' and 10' for cleaning purposes, each of the toothed pinions 11' and 12' has a differing number of teeth, which is a function of the pitch corresponding to spires 9' and 10' of the helical blade elements 1', 2' in question. In this case, the difference in the pitch of respective spires 9' and 10' is compensated for by the differing speeds of rotation of shafts 7' and 8', shaft 8', driven by chain 13', turning faster than shaft 7', but in the same direction.

Figure 5:
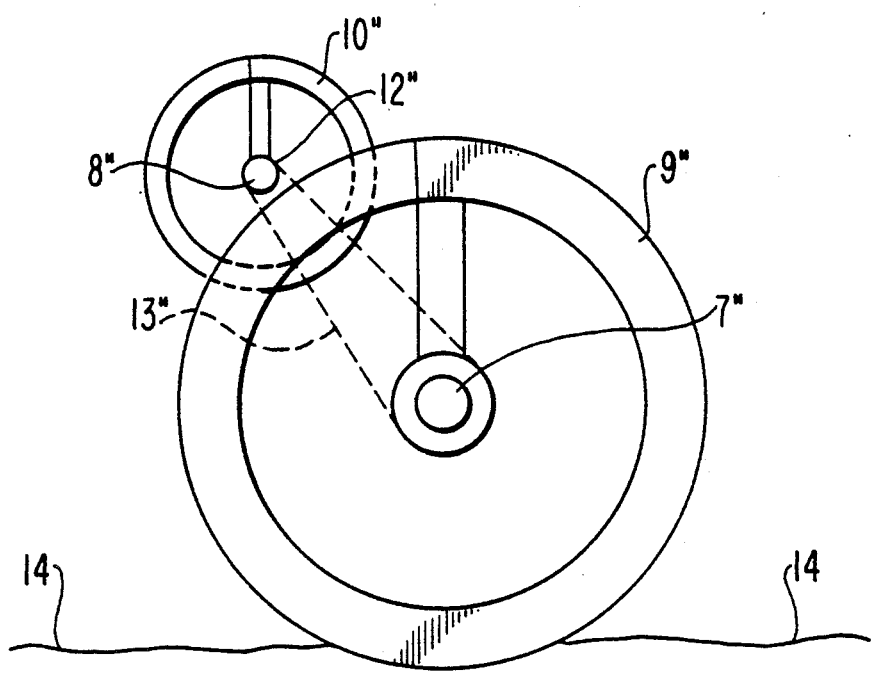
FIG. 5 is a side view of a second embodiment of the device.

FIG. 5 shows a second embodiment of the apparatus, in which a difference in diameter between two helical blade elements 1", 2" is even greater than in the FIG. 4 device, thereby causing the spires 9" and 10" borne by shafts 7" and 8" to turn at speeds whose difference is likewise greater. The acute angle formed between the reciprocating-motion ends of the endless chain 13' is also greater than in FIG. 4 (or, put another way, the difference in size between the pinions 11" and 12" of FIG. 5 is greater than the difference in size between pinions 11' and 12' of FIG. 4).

Figure 6:
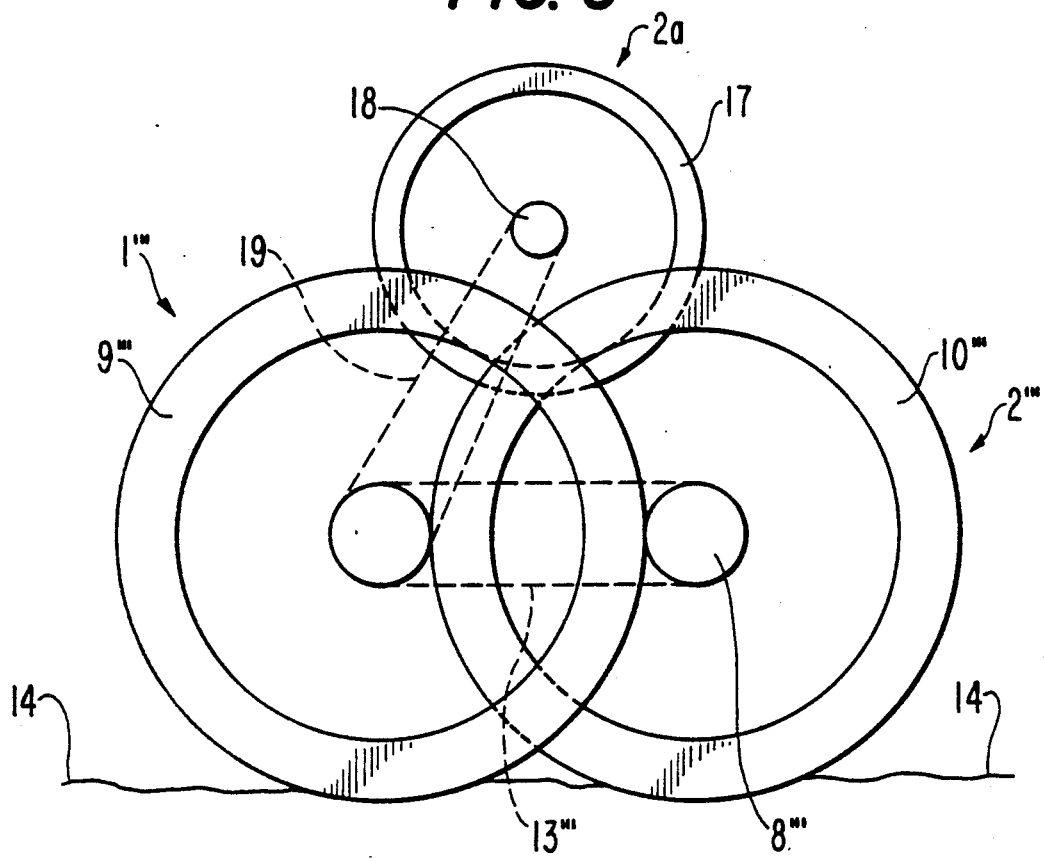
FIG. 6 is a side view of a third embodiment of the apparatus.

Finally, FIG. 6 illustrates a third embodiment of the device according to the invention incorporating three helical elements 1''', 2''' and 2a whose spires 9''', 10''' and 17 are borne by shafts set parallel to each other, i.e., shafts 7''', 8''', and 18, and extending through vertices of a triangle forming each of the forks providing for the assembly of the rotating helical elements.

In this embodiment, provided solely as an example, the spires 9''' and 10''' of the helical blade elements 1''' and 2''' have the same pitch and diameter, and work simultaneously in conjunction with each other and with a third helical element equipped with spires 17, which are smaller and have a pitch differing from the two other spires 9''' and 10'''. In this embodiment, shaft 7''' of the first large helical element 1''' has two toothed pinions fixed thereto which have different numbers of teeth. These pinions are either mounted both on one end of the shaft 7''', or one on each of the opposing ends of the shaft 7''''. Shafts 7'''' and 8''' are connected by means of a chain referenced as 13'''. Shaft 7''' is also operatively connected to shaft 18 by, for example, a chain 19.

In all of the embodiments just described, the various spires may, when seen in cross-section, have a different shape adapted to the specific case.

Figure 7:
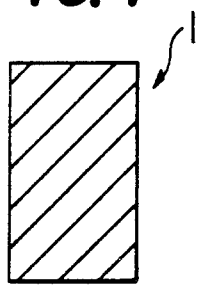
FIGS. 7-10 show alternative cross sectional configurations for the helical blade elements usable with any of the embodiments shown in FIGS. 1-6.
Figure 8:
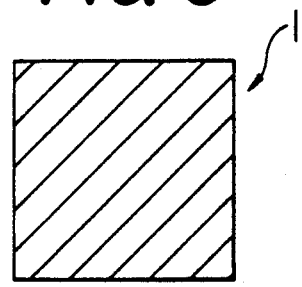
Figure 9:
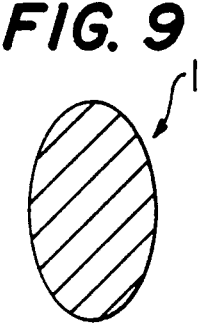
Figure 10:
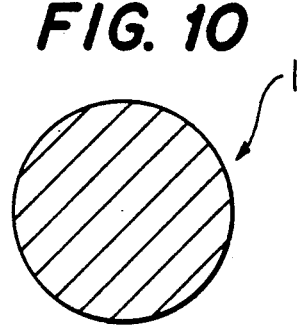

Thus, the spires may, in cross-section have a rectangular (see FIG. 7), square (see FIG. 8), rhomboidal, oval (see FIG. 9), or simply a circular shape (see FIG. 10), the choice of these shapes to be made as a function of the diameter, rotation speed and pitch of the spires, as well as of the conditions of the land and the nature of the ground to be worked by the device.

As shown in FIGS. 1-6, each of the helical blade elements (e.g. 1, 2) is substantially hollow with only the plurality of radially extending connector elements 20 being interposed between its inner periphery and the outer periphery of each respective shaft (e.g. 7, 8). That is, a substantially empty space is formed in surrounding relation about each of the shafts (e.g. 7, 8) from an outer periphery thereof to an inner periphery of each of the spires (e.g. 9, 10) of each of the helical blade elements (e.g. 1, 2).

It is obvious that the invention has been described and illustrated only for purely explanatory purposes, and that various changes in detail could be incorporated in the various embodiments shown, while still remaining within the scope of the invention.

Thus, in particular, the various helical blade elements of the device according to the invention could be constituted not only be a chain, but also by sets of meshing pinions or synchronous belts. Similarly, the various helical blade elements, instead of being set parallel to each other, could be oriented in different directions, the connection joining the respective shafts being possibly achieved by means of Bowden cables driven by reduction gears fitted on the forks or analogous elements used to mount the helical blade elements.

We claim:

1. An apparatus for treating soil, comprising:

a carrier frame;

a first shaft rotatably mounted to said carrier frame for rotation about a first axis;

a first helical blade element fixed for rotation with said first shaft about said first axis and having a plurality of spires, each of which has a substantially identical diameter and helical pitch;

a second shaft rotatably mounted to said carrier frame for rotation about a second axis substantially parallel to said first axis and spaced a predetermined distance from said first axis;

a second helical blade element fixed for rotation with said second shaft about said second axis and in substantially parallel relation with said first helical blade element, said second helical blade having a plurality of spires, each of which has a substantially identical diameter and helical pitch;

said predetermined distance between said first and second shafts, and said diameters and helical pitches of said plurality of spires of each of said first and second helical blade elements, respectively, being such that when said first and second helical blade elements are rotated together, said spires of said first helical blade element are maintained in close contact with said spires of said second helical blade element;

a substantially empty space being formed in surrounding relation about one of said first and second shafts from an outer periphery of said one of said first and second shafts to an inner periphery of each of said plurality of spires of the one of said first and second helical blade elements fixed to said one of said first and second shafts;

a third shaft rotatably mounted to said carrier frame for rotation about a third axis substantially parallel to said first and second axes and spaced a predetermined distance from each of said first and second axes;

a third helical blade element fixed for rotation with said third shaft about said third axis and having a plurality of spires, each of which has a substantially identical diameter and helical pitch; and said predetermined distance between said third axis and said first and second axes, and said diameters and helical pitches of said third helical blade element being such that when said third helical blade element is rotated together with said first and second helical blade elements, said spires of said third helical blade element are maintained in contact with said spires of at least one of said first and second helical blade elements.

2. An apparatus as recited in claim 1, wherein
said substantially empty space is formed in surrounding relation about said first shaft; and
a substantially empty space is formed in surrounding relation about said second shaft from an outer periphery of said second shaft to an inner periphery of each of said plurality of spires of said second helical blade element.

3. An apparatus as recited in claim 2, further comprising connecting means for operatively connecting said first shaft to said second shaft such that said first and second shafts are forced to rotate in unison.

4. An apparatus as recited in claim 3, wherein
said connecting means comprises an endless element operatively fixed for rotation with both of said first and second shafts.

5. An apparatus as recited in claim 4, wherein
said connecting means further comprises a first pinion gear fixed for rotation with said first shaft and a second pinion gear fixed for rotation with said second shaft; and
said endless element comprises an endless chain trained about said first and second pinion gears.

6. An apparatus as recited in claim 2, wherein
said diameter of each of said spires of said first helical blade element is substantially identical to said diameter of each of said spires of said second helical blade element.

7. An apparatus as recited in claim 2, wherein
said diameter of each of said spires of said first helical blade element is different than said diameter of each of said spires of said second helical blade element.

8. An apparatus as recited in claim 2, wherein
said helical pitch of each of said spires of said first helical blade element is substantially identical to said helical pitch of each of said spires of said second helical blade element.

9. An apparatus as recited in claim 2, wherein
said helical pitch of each of said spires of said first helical blade element is different than said helical pitch of each of said spires of said second helical blade element.

10. An apparatus as recited in claim 1, wherein
a substantially empty space is formed in surrounding relation about said third shaft from an outer periphery of said third shaft to an inner periphery of each of said plurality of spires of said third helical blade element.

11. An apparatus as recited in claim 1, further comprising
means for operatively connecting said third shaft to one of said first and second shafts such that said third shaft is forced to rotate in unison with said one of said first and second shafts.

12. An apparatus as recited in claim 1, further comprising
connecting means for operatively connecting said first shaft to said second shaft such that said first and second shafts are forced to rotate in unison.

13. An apparatus as recited in claim 12, wherein
said connecting means comprises an endless element operatively fixed for rotation with both of said first and second shafts.

14. An apparatus as recited in claim 13, wherein
said connecting means further comprises a first pinion gear fixed for rotation with said first shaft and a second pinion gear fixed for rotation with said second shaft; and
said endless element comprises an endless chain trained about said first and second pinion gears.

15. An apparatus as recited in claim 1, wherein
said diameter of each of said spires of said first helical blade element is substantially identical to said diameter of each of said spires of said second helical blade element.

16. An apparatus as recited in claim 1, wherein
said diameter of each of said spires of said first helical blade element is different than said diameter of each of said spires of said second helical blade element.

17. An apparatus as recited in claim 1, wherein
said helical pitch of each of said spires of said first helical blade element is substantially identical to said helical pitch of each of said spires of said second helical blade element.

18. An apparatus as recited in claim 1, wherein
said helical pitch of each of said spires of said first helical blade element is different than said helical pitch of each of said spires of said second helical blade element.

19. An apparatus as recited in claim 1, wherein
each of said spires of each of said first and second helical blade elements has a rectangular cross section.

20. An apparatus as recited in claim 1, wherein
each of said spires of each of said first and second helical blade elements has a square cross section.

21. An apparatus as recited in claim 1, wherein
each of said spires of each of said first and second helical blade elements has an oval cross section.

22. An apparatus as recited in claim 1, wherein
each of said spires of each of said first and second helical blade elements has a circular cross section.

* * * * *